United States Patent
Liu et al.

(10) Patent No.: US 8,582,322 B2
(45) Date of Patent: Nov. 12, 2013

(54) POWER REDUCTION OF A POWER SUPPLY UNIT AT LIGHT LOADING OR NO LOADING

(75) Inventors: Kuo-Chi Liu, Hsinchu (TW); Fu-Sheng Tsai, Taoyuan County (TW); Chung-Cheng Chang, Taichung (TW); Kuang-Feng Li, Changhua County (TW); Yen-Te Lee, Chiayi County (TW)

(73) Assignee: Richtek Technology Corp., Hsinchu (TW)

( * ) Notice: Subject to any disclaimer, the term of this patent is extended or adjusted under 35 U.S.C. 154(b) by 1 day.

(21) Appl. No.: 13/419,542

(22) Filed: Mar. 14, 2012

(65) Prior Publication Data

US 2012/0235658 A1    Sep. 20, 2012

(30) Foreign Application Priority Data

Mar. 18, 2011 (TW) .............................. 100109314 A

(51) Int. Cl.
*H02M 3/335* (2006.01)
*H02M 7/44* (2006.01)

(52) U.S. Cl.
USPC .... 363/21.04; 363/20; 363/21.05; 363/21.07; 363/21.09; 363/21.1; 363/21.11; 363/95; 363/97; 363/131

(58) Field of Classification Search
USPC ............... 363/20, 21.01, 21.04, 21.05, 21.07, 363/21.09, 21.1, 21.11, 95, 97, 131
See application file for complete search history.

(56) References Cited

U.S. PATENT DOCUMENTS

| | | | | |
|---|---|---|---|---|
| 5,831,837 A | * | 11/1998 | Coyne et al. | 363/21.08 |
| 8,120,931 B2 | * | 2/2012 | Chang et al. | 363/21.07 |
| 8,184,459 B2 | * | 5/2012 | Fujii | 363/97 |
| 8,416,596 B2 | * | 4/2013 | Huang | 323/282 |
| 2011/0044076 A1 | * | 2/2011 | Zhang et al. | 363/21.17 |
| 2011/0096574 A1 | * | 4/2011 | Huang | 363/21.18 |

* cited by examiner

*Primary Examiner* — Bao Q Vu
(74) *Attorney, Agent, or Firm* — Muncy, Geissler, Olds & Lowe, PLLC

(57) ABSTRACT

A power supply unit includes a switching power converter responsive to a control signal to switch a power switch thereof to provide an output voltage and an output current for a load. To reduce light-load or no-load power consumption of the power supply unit, the power supply unit repeats a process of stopping switching the power switch and recovering switching the power switch for a period of time once the output voltage decreases to be lower than a reference voltage.

14 Claims, 6 Drawing Sheets

US 8,582,322 B2

POWER REDUCTION OF A POWER SUPPLY UNIT AT LIGHT LOADING OR NO LOADING

FIELD OF THE INVENTION

The present invention is related generally to a power supply unit and, more particularly, to a circuit and method for reducing light-load or no-load power consumption of a power supply unit.

BACKGROUND OF THE INVENTION

Most consumer electronic products require a power supply unit, such as an adapter and a charger, as a power source or charging the batteries thereof. However, in no-load condition or the batteries already fully charged, the internal circuitry of the power supply unit remains in operation and therefore still consumes electric power. The accumulated power consumption can be considerable if the power supply unit is left turned on for a long time.

In a conventional power supply unit, as shown in FIG. 1, a switching power converter 10 converts an input voltage Vin into an output voltage Vout under control of a controller 12 to provide for load. In order to reduce power consumption, the power supply unit will enter a burst mode at light loading or no loading, in which the power switch Qsw will skip several switching cycles as long as the output voltage Vout is sufficiently high, and the operation current of the controller 12 will be lowered, thereby reducing the total power consumption of the controller 12 and the switching power converter 10. In addition, the photocoupler 14 at the secondary side uses one having a higher current transfer ratio (CTR) to generate a same feedback current Ic under a lower forward bias current If, and the voltage stabilizer circuit 16 uses a shunt regulator 17 having a smaller operation current, such as TLV431, to reduce the operation current of the feedback network in a constant output voltage Vout mode, and thereby reduce the power consumption of the entire feedback network. However, a photocoupler 14 having a high current transfer ratio needs a shunt regulator 17 having a smaller operation current, and thus the circuit requires higher component costs and the photocoupler 14 may have stability issue due to a lower forward bias current If.

SUMMARY OF THE INVENTION

An objective of the present invention is to provide a circuit and method for reducing light-load and no-load power consumption of a power supply.

According to the present invention, a power supply unit includes a switching power converter responsive to a control signal to switch a power switch thereof to provide an output voltage and an output current, a load detector to detect a load condition to generate a first signal, a voltage detector to compare the output voltage with a reference voltage to generate a second signal, and a disable circuit to determine a third signal according to the first signal and the second signal to stop switching the power switch.

According to the present invention, a method for a power supply unit includes switching a power switch in response to a control signal to provide an output voltage and an output current, detecting a load condition to generate a first signal, comparing the output voltage with a reference voltage to generate a second signal, and determining a third signal according to the first signal and the second signal to stop switching the power switch.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
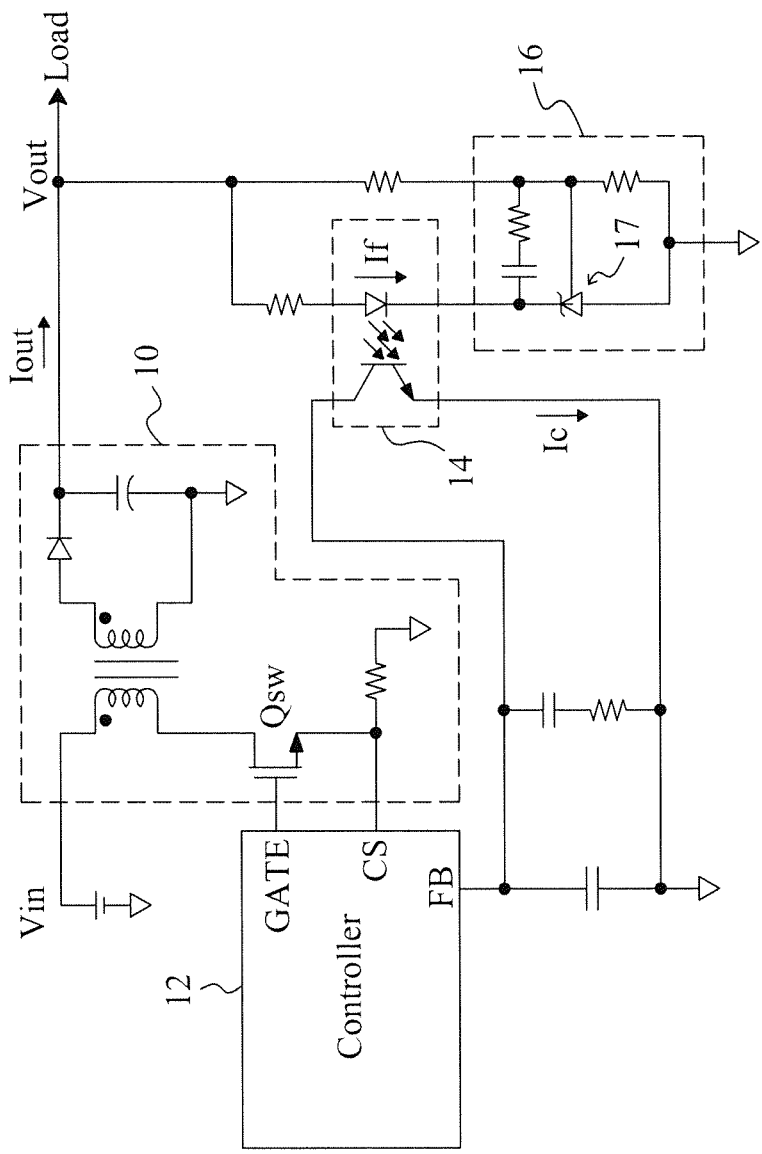
FIG. 1 is a circuit diagram of a conventional power supply unit.
Figure 2:
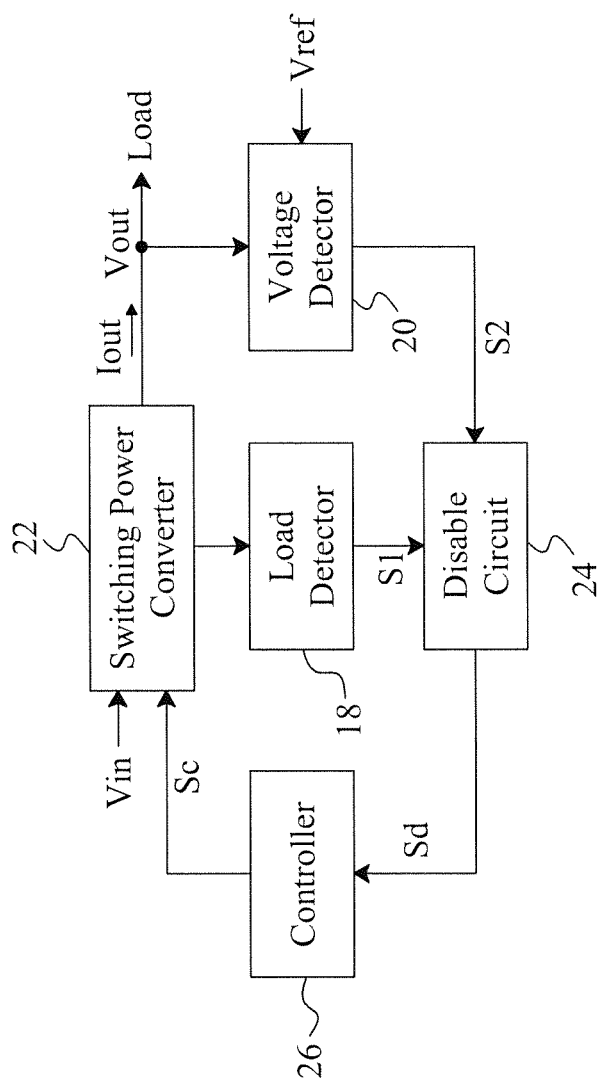
FIG. 2 is a system block diagram according to the present invention.
Figure 3:
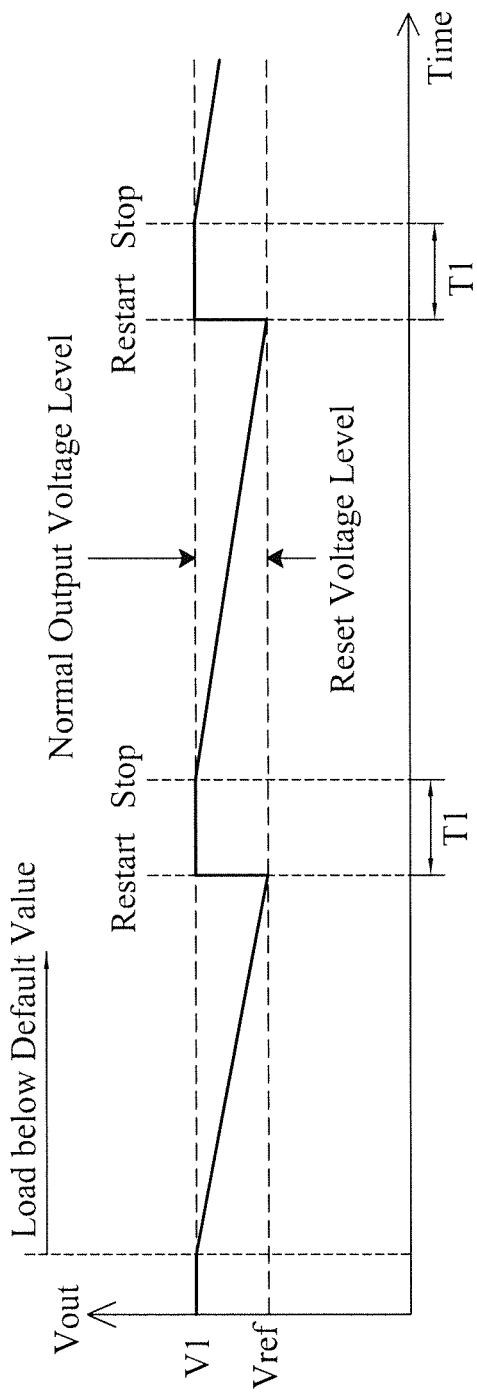
FIG. 3 is a waveform diagram of the output voltage of the power supply unit shown in FIG. 2 after the power supply unit enters a low load condition.

FIG. 2 is a system block diagram according to the present invention, and FIG. 3 is a waveform diagram of the output voltage of the power supply unit shown in FIG. 2 after the power supply unit enters a low load condition. In FIG. 2, the same as the conventional power supply unit shown in FIG. 1, a switching power converter 22 converts an input voltage Vin into an appropriate output voltage Vout and provides an output current Tout for load by switching a power switch thereof under control of a control signal Sc; however, in order to reduce light-load and no-load power consumption, a load detector 18 and a voltage detector 20 are used to detect the switching power converter 22 to generate signals S1 and S2 for a disable circuit 24, which generates a signal Sd according to the load condition detected by the load detector 18 and the condition of the output voltage Vout detected by the voltage detector 20, for the controller 26 to adjust the operation of the power switch in the switching power converter 20. The load detector 18 is used to identify whether the load is lower than a default value, and can be implemented in various ways. Taking an isolated type voltage converter as the switching power converter 20 for example, the load detector 18 may detect the load condition via, for instance, the voltage at the primary-side windings, the current of the power switch, the voltage at the secondary-side windings, the output current Tout, or an auxiliary windings, for generating the signal S1 for the disable circuit 24. The voltage detector 20, on the other hand, is used to detect the output voltage Vout and compare the output voltage Vout with a reference voltage Vref to generate the signal S2 for the disable circuit 24. At normal loading, the switching power converter 22 generates a regulated output voltage Vout as a conventional one. However, when the load detector 18 detects that the load is lower than a default value, the disable circuit 24 will assert the signal Sd in response to the signal S1, to signal the controller 26 to stop switching the power switch in the switching power converter 22, and consequently the power supply unit will enter an energy saving state, in which the output voltage Vout continues falling from V1, as shown in FIG. 3, until the voltage detector 20 subsequently detects that the output voltage Vout becomes lower than the reference voltage Vref, to assert the signal S2 to cause the disable circuit 24 to turn off the signal Sd and thereby signal the controller 26 to restore the control signal Sc, and as a result the switching power converter 22 is re-activated to recover the output voltage Vout back to V1 and maintain the output voltage Vout at V1 for a period of time T1. Afterward, the disable circuit 24 once again asserts the signal Sd to signal the controller 26 to stop operating the switching power converter 22, and the foregoing process is repeated. The operation mode described above makes it possible to dispense with the costly components required in the conventional power supply unit and remove the aforementioned stability problem, thus increasing product competitiveness in a cost-efficient manner.

Figure 4:
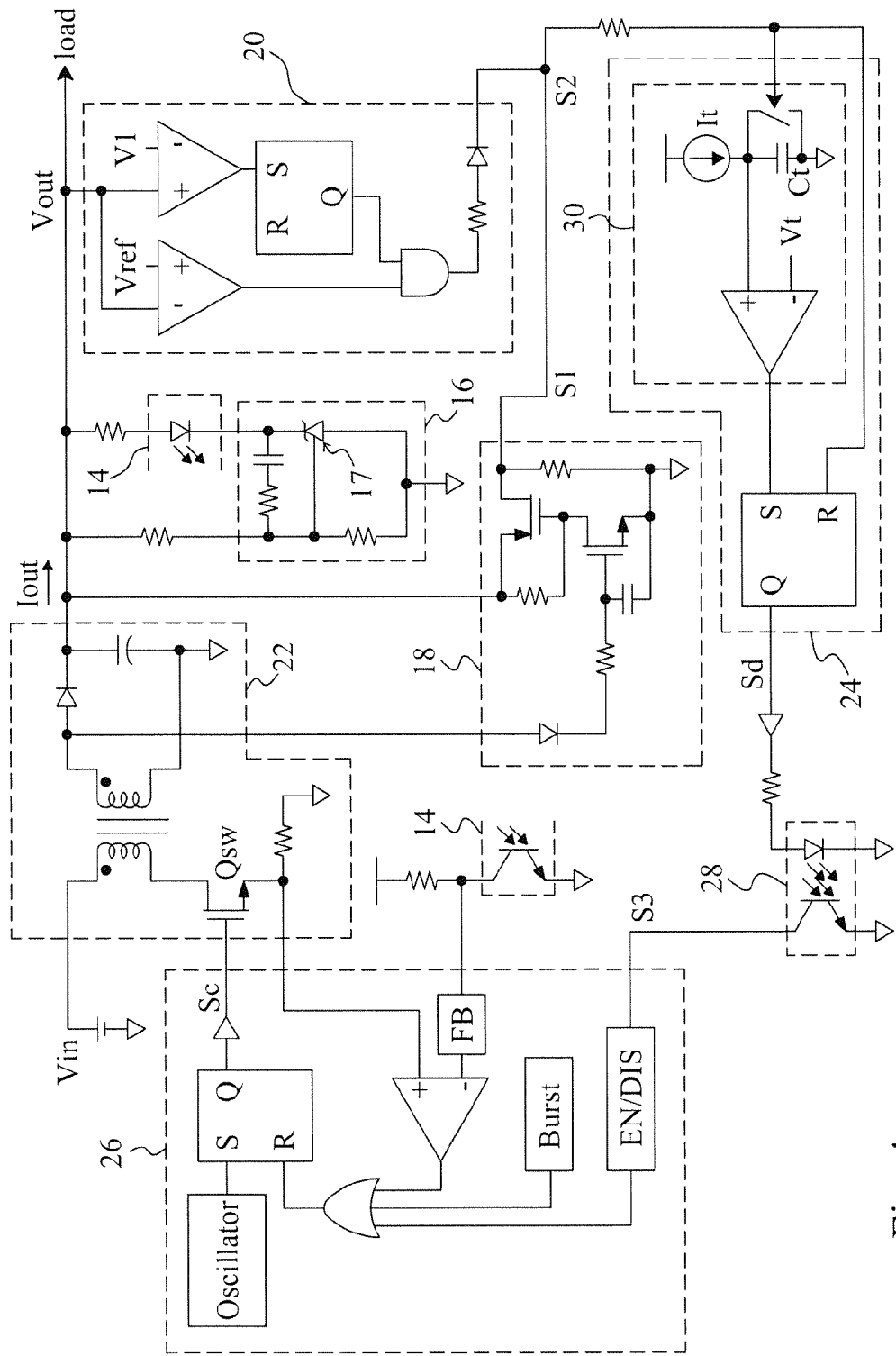
FIG. 4 is a circuit diagram of a first embodiment according to the present invention.

FIG. 4 is a circuit diagram of a first embodiment according to the present invention, which uses an isolated type voltage converter as the switching power converter 22, and the photocoupler 14 for feedback of the secondary-side condition to the controller 26 on the primary side. The load detector 18 detects the secondary-side output current Iout to generate the signal S1, the voltage detector 20 detects the output voltage Vout and compares the output voltage Vout with the reference voltage Vref to generate the signal S2, the disable circuit 24 is coupled to the load detector 18 and the voltage detector 20 to generate the signal Sd responsive to the signals S1 and S2, and another photocoupler 28 converts the signal Sd into a signal S3 supplied to the controller 26. In this embodiment, the load detector 18 includes an integrator for performing integration on the output current Iout, and if a sufficiently high load is present, the load detector 18 will assert the signal S1 to reset a timer 30 in the disable circuit 24. At a too low load, when the timer 30 counts up to a reference time, the disable circuit 24 triggers the signal Sd and thereby the controller 26 stops switching the power switch Qsw, resulting in a reduced operation current and thereby reduced power consumption. In this state, the output voltage Vout will decrease slowly due to the fact that the power switch Qsw is no longer switched. Once the voltage detector 20, which compares the output voltage Vout with the reference voltage Vref, detects that the former becomes lower than the latter, it will asserts the signal S2 to reset the timer 30 in the disable circuit 24 and thus the signal Sd will be turned off. Hence, the controller 26 restores the control signal Sc for switching the power switch Qsw, and the output voltage Vout will be pulled back to V1. When the reference time T1 has elapsed as counted by the timer 30, the disable circuit 24 triggers the signal Sd again, and the switching of the power switch Qsw is stopped once more.

Figure 5:
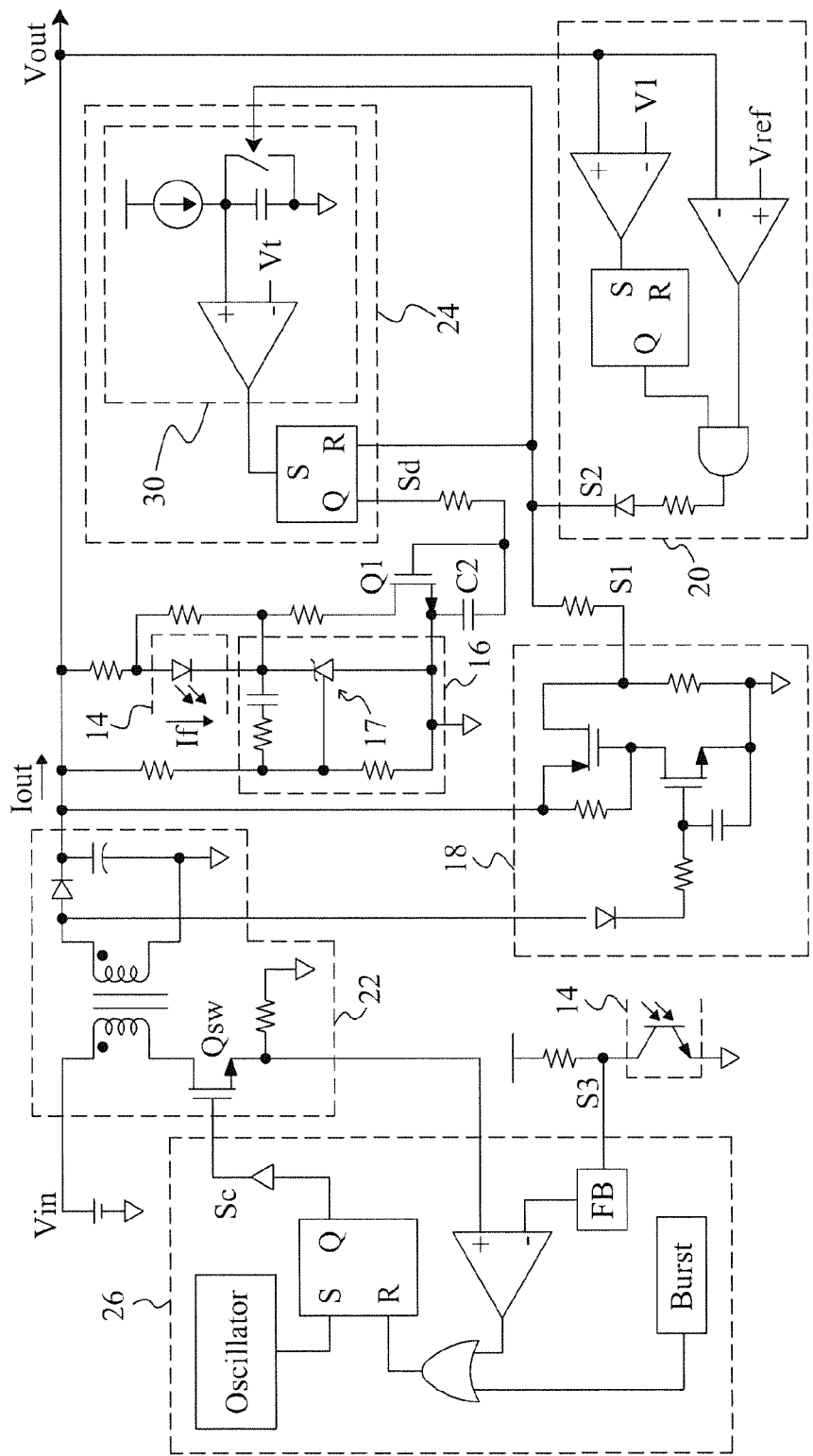
FIG. 5 is a circuit diagram of a second embodiment according to the present invention.

FIG. 5 is a circuit diagram of a second embodiment according to the present invention, which is similar to that shown in FIG. 4 except that the signal Sd generated by the disable circuit 24 is converted into the signal S3 supplied to the controller 26 by the photocoupler 14 in the feedback network instead. At light loading or no loading, the signal Sd generated by the disable circuit 24 turns on the transistor Q1, thus allowing a large amount of current If to flow through the photocoupler 14, and the controller 26 obtains the signal S3 from the photocoupler 14 and, upon determining that the switching power converter 22 has converted too much energy, stops switching the power switch Qsw. As a result, the output voltage Vout decreases slowly. Once the output voltage Vout becomes lower than the reference voltage Vref, the signal Sd is turned off; consequently, the transistor Q1 is turned off. The feedback network and the controller 26 then resume normal operation. As soon as the output voltage Vout goes back to V1, the timer 30 is activated to count the time elapsed, and after the time period T1, the switching of the power switch Qsw stops again.

Figure 6:
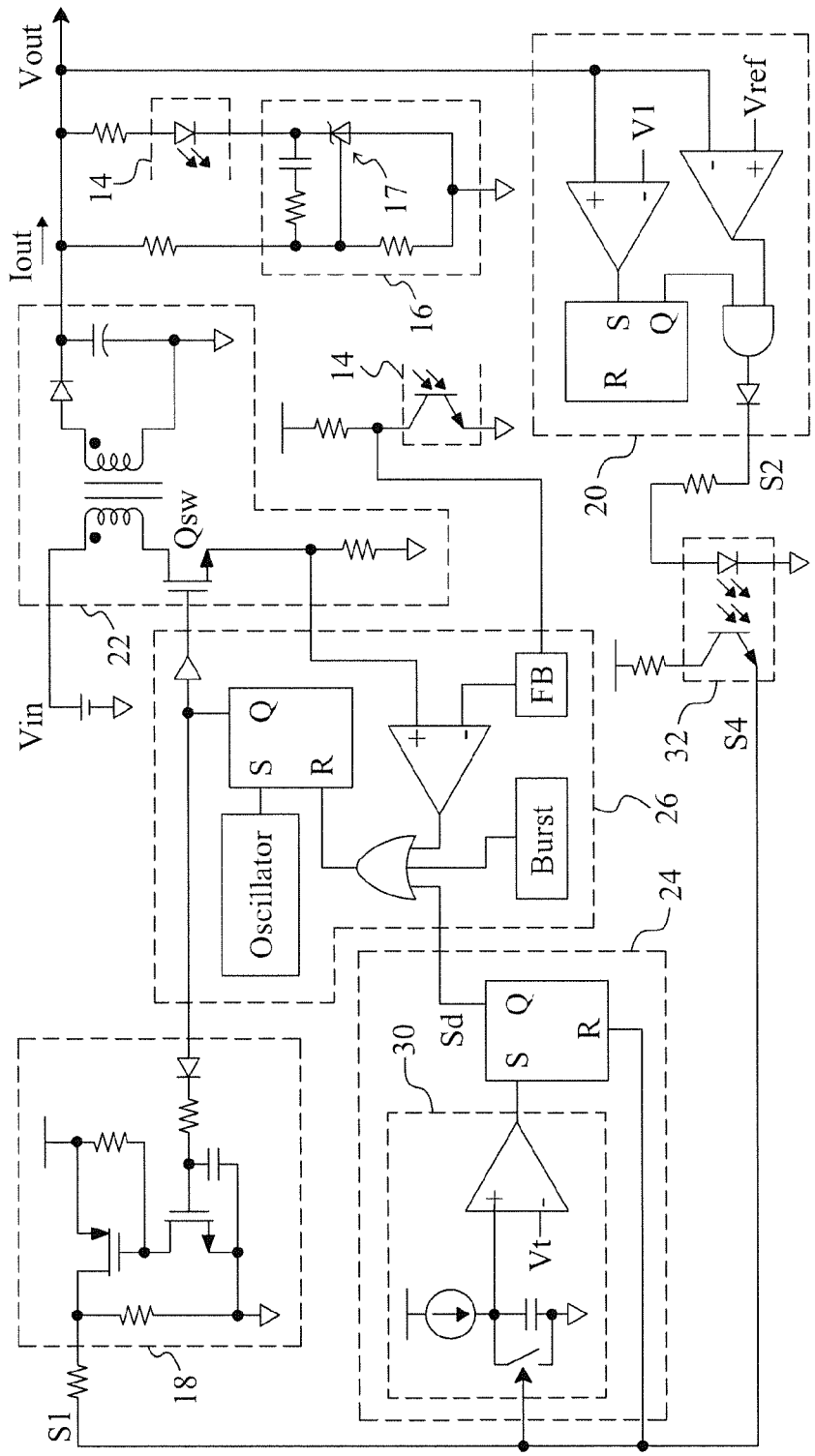
FIG. 6 is a circuit diagram of a third embodiment according to the present invention.

FIG. 6 is a circuit diagram of a third embodiment according to the present invention. As the controller 26 will shorten the on-time of the power switch Qsw responsive to the feedback signal received from the feedback network when the load decreases, the time for which the control signal Sc stays high will be shortened, too. By using this principle, the load detector 18 in this embodiment detects the control signal Sc at the primary side to identify the load condition, and the signal S1 thus generated is delivered to the disable circuit 24, which is also located at the primary side. However, due to the voltage detector 20 for detecting the output voltage Vout remaining at the secondary side, a photocoupler 32 is coupled between the voltage detector 20 and the disable circuit 24 to convert the signal S2 generated by the voltage detector 20 into the signal S4 supplied to the disable circuit 24. The disable circuit 24 then determines the signal Sd according to the signals S1 and S4 and hence determines the operation mode of the controller 26 and of the power switch Qsw.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power supply unit, comprising:
   a switching power converter responsive to a control signal to switch a power switch thereof to provide an output voltage and an output current for a load;
   a controller coupled to the switching power converter to provide the control signal;
   a load detector coupled to the switching power converter or the controller, detecting a load condition to generate a first signal;
   a voltage detector coupled to the switching power converter, detecting the output voltage and comparing the output voltage with a reference voltage to generate a second signal; and
   a disable circuit coupled to the load detector, the voltage detector and the controller, determining a third signal according to the first signal and the second signal to signal the controller to stop switching the power switch.

2. The power supply unit of claim 1, wherein the disable circuit comprises a timer coupled to the load detector and the voltage detector, to be reset by the first signal or the second signal, and if the timer is not reset when a reference time has elapsed, it triggers the third signal to signal the controller to stop switching the power switch.

3. The power supply unit of claim 1, wherein the switching power converter comprises an isolated type voltage converter.

4. The power supply unit of claim 3, further comprising a photocoupler coupled between the disable circuit and the controller, to convert the third signal into a fourth signal supplied to the controller.

5. The power supply unit of claim 3, further comprising a photocoupler coupled between the voltage detector and the disable circuit, to convert the second signal into a fourth signal supplied to the disable circuit.

6. The power supply unit of claim 1, wherein the load detector comprises an integrator for performing integration on the output current or the control signal to determine the first signal.

7. The power supply unit of claim 1, wherein the load detector detects the output current to identify whether the load is lower than a default value.

8. The power supply unit of claim 1, wherein the load detector detects the control signal to identify whether the load is lower than a default value.

9. The power supply unit of claim 1, wherein the load detector detects a current of the power switch to identify whether the load is lower than a default value.

10. A method for a power supply unit, comprising steps of:
- A.) switching a power switch in response to a control signal to provide an output voltage and an output current for a load;
- B.) detecting a load condition to generate a first signal;
- C.) detecting the output voltage and comparing the output voltage with a reference voltage to generate a second signal; and
- D.) determining a third signal according to the first signal and the second signal to stop switching the power switch.

11. The method of claim 10, wherein the step B comprises a step of detecting the output current to identify whether the load is lower than a default value.

12. The method of claim 10, wherein the step B comprises a step of detecting the control signal to identify whether the load is lower than a default value.

13. The method of claim 10, wherein the step B comprises a step of detecting a current of the power switch to identify whether the load is lower than a default value.

14. The method of claim 10, wherein the step D comprises steps of:
- resetting a timer by the first signal or the second signal; and
- triggering the third signal when a reference time has elapsed as counted by the timer.

* * * * *